Nov. 25, 1958 F. C. WILLIAMS ET AL 2,862,139

ELECTROSTATIC STORAGE OF DIGITAL INFORMATION

Filed July 25, 1952 4 Sheets-Sheet 1

INVENTORS:
F. C. WILLIAMS
T. KILBURN
ATTORNEYS:
Moore & Hall

ELECTROSTATIC STORAGE OF DIGITAL INFORMATION

Filed July 25, 1952 4 Sheets-Sheet 2

INVENTORS:
F.C. WILLIAMS
T. KILBURN
ATTORNEYS:
Morrow & Hall

INVENTORS:
F. C. WILLIAMS
T. KILBURN
ATTORNEYS:
Moore & Hall

ELECTROSTATIC STORAGE OF DIGITAL INFORMATION

Filed July 25, 1952 4 Sheets-Sheet 4

INVENTORS:
F.C. WILLIAMS
T. KILBURN
ATTORNEYS:
Morse & Hall 2,862,139
Patented Nov. 25, 1958

2,862,139

ELECTROSTATIC STORAGE OF DIGITAL INFORMATION

Frederic C. Williams, Timperley, and Tom Kilburn, Manchester, England, assignors to National Research Development Corporation, London, England Application July 25, 1952, Serial No. 300,798

Claims priority, application Great Britain July 30, 1951

4 Claims. (Cl. 315—12)

The present invention relates to electrostatic storage of digital information employing apparatus of the type in which a cathode ray beam is directed successively and recurrently upon a series of adjacent areas (referred to as digit areas) upon an electric charge-retaining recording surface to record information on such areas in the form of two different states of electrostatic charge. Voltages generated in a signal plate capacitively coupled to the recording surface are used to control the bombardment in such a manner that the charges on the digit areas are regenerated. The time interval allotted to each digit at each bombardment of a digit area by the beam will be referred to as a digit interval.

In certain forms of apparatus of the type set forth, for example in the form described in the specification of co-pending application of Frederic C. Williams and Tom Kilburn, Ser. No. 50,136, filed September 20, 1948, one of the aforesaid states of charge is produced by bombarding an element of a digit area to eject secondary electrons therefrom and thus to produce a positive charge on the element, and the other state of charge is produced by first bombarding an element of a digit area to eject secondary electrons therefrom and thereafter releasing secondary electrons to the element in order to decrease the positive charge on such element.

In such apparatus the voltage used for regeneration may be that derived from switching the beam on when it is directed upon an element. When the voltage generated in the signal plate at this time is negative-going, the beam is switched off without first reducing the positive charge on the element. When the voltage is positive-going however the beam is left switched on upon an adjacent region of the surface, or is switched off and then switched on again upon the adjacent region, in order to reduce the positive charge on the element.

Figure 1:
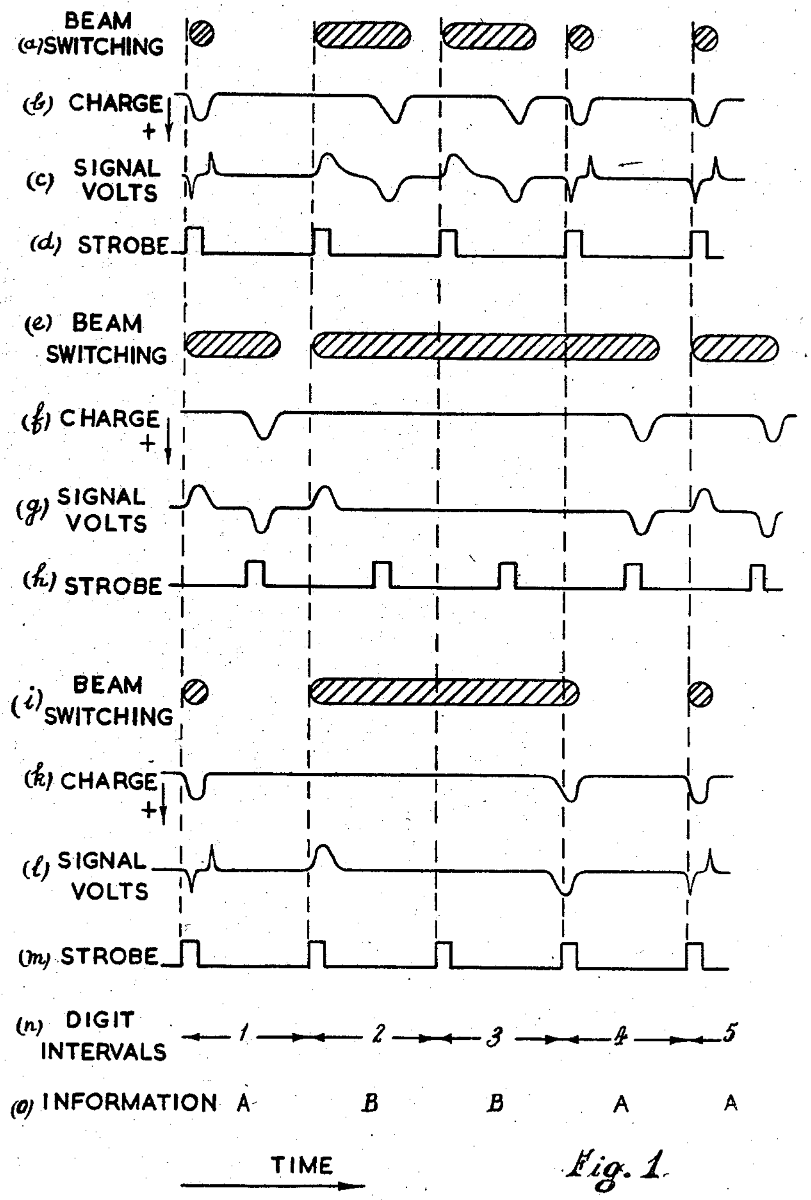

One form of the apparatus set forth in the aforementioned prior specification operates according to what is known as the dot-dash method, and the mode of operation of such apparatus will be briefly referred to with reference to Figure 1(*a*) to (*d*) of the accompanying drawings. In Figure 1 the abscissa is shown as time, and this is on the assumption, which is often the case, that the beam is moved continuously over a line on the recording surface. In the case of the curves illustrating charge, that is to say curves (*b*), (*f*) and (*k*) in Figure 1, it may be more convenient to regard the abscissa as the position on the recording surface of the various charges indicated. It should be noted that in these charge curves the positive sense is downward whereas in all the other curves the positive is indicated in an upward direction as usual. In Figure 1 there are shown at (*n*) five digit intervals, each of these intervals corresponding to the time of passage of the beam over one digit area on the recording surface.

The nature of the information to be stored in these digit intervals is indicated at (*o*) in Figure 1, the two kinds of information being indicated as A and B respectively. It will be appreciated that these two kinds of information may be 0 and 1 or 1 and 0 respectively, or may have any other desired digital significance.

In Figure 1(*a*) the shaded dot and dash areas represent the times during which the beam is switched on in order to record the information given at (*o*). At (*b*) there is shown approximately the nature of the charge produced upon the recording surface by the beam switching at (*a*). A dot produces a "well" of positive charge whereas with a dash the "well" at the beginning of a digit interval is filled in by secondary electrons liberated from the subsequently-scanned area, and a "well" is left at the end of the dash. At (*c*) is shown the voltage generated at the signal plate when the beam is switched in the manner shown at (*a*) in Figure 1 upon the charge pattern at (*b*). At (*d*) is shown the strobe waveform which is used to select the desired parts of the voltage waveform at (*c*). In this case it is seen that this desired part is that occurring at the commencement of each digit interval. In the case of a dot the voltage selected by the strobe waveform is that known as a cloud pulse, namely a negative-going pulse arising from the cloud of electrons arriving on the screen. In the case of a dash the voltage selected is the positive-going pulse arising from a re-excavation of the well of positive charge, the well having been re-filled by the secondary electrons liberated from the latter part of the dash during the previous scan. Hitherto only the positive-going one of these voltages has been used to control the cathode ray beam for the purpose of regeneration. The voltage selected can be employed to regenerate the charge pattern since when the selected voltage is negative the beam is required to be switched off after the strobe pulse, whereas when it is positive the beam is required to remain switched on for the whole of a dash period.

The spacing between adjacent areas representing dots and dashes is so chosen that the positive "well" representing a dot is not appreciably re-filled by secondary electrons ejected from the adjacent area representing a dot or dash. It is known that the critical spacing between the centres of two adjacent spots above which the re-filling is negligible is about 1.3 D, where D is the spot diameter.

In another form of apparatus of the type set forth, which is described for example in the specification of co-pending patent application of Frederic C. Williams, Ser. No. 790,879, filed December 10, 1947, in order to record one digit the beam is switched off at the end of each digit interval by what is known as a clock pulse, whilst in order to record the other digit the clock pulse is suppressed. This mode of operation is illustrated in Figure 1 at (*e*) to (*h*). (*e*) is a diagram corresponding to diagram (*a*) showing the beam switching; (*f*) shows the charge distribution corresponding to the switching at (*e*); (*g*) shows the signal voltage which is generated if a beam maintained at a constant intensity is swept over the charge pattern shown at (*f*); and (*h*) shows the strobe waveform used to select the desired portions of the waveform at (*g*). In this case the desired voltage is what is known as an anticipation pulse which it is seen occurs immediately before each switching off of the beam. An anticipation pulse is seen to occur in curve (*c*) at the end of each dash, but in the dot-dash method of operation these pulses are not made use of. In applying the signal selected by the strobe (*h*) to regenerate the charge pattern at (*f*) it is arranged that whenever the signal voltage strobed is negative the beam is switched off, whilst when the voltage is zero the beam is allowed to remain turned on.

For many purposes it is important that the speed of operation should be as high as possible, and this is equivalent to the digit intervals being as short as possible. It is also important in many cases that the size of a digit area should be made as small as possible. With the method just described using anticipation pulses, it has been found possible to reduce the digit interval to about 2 microseconds. This interval, although short, is longer than is desired for many purposes.

The present invention has for its object to provide an improved method and apparatus for storing information in which the speed of operation can be substantially increased and the size of a digit area substantially reduced in comparison with known apparatus.

According to the present invention a method of storing digital information in the form of electrostatic charges on a charge-retaining surface and of reading such stored information comprises sweeping a cathode ray beam over the said surface, switching the beam on at the commencement of each digit interval, unless it is already switched on, thus producing a positive charge on the surface, representing one digit by switching the beam off before said charge has been neutralised by secondary electrons from an adjacent region of the screen and maintaining the beam switched off for the remainder of the digit interval, representing another digit by maintaining the beam switched on throughout the whole digit interval, and reading the stored information by extracting the voltage generated at the commencement of each digit interval in a signal plate capacitively coupled to the said surface.

The beam may be maintained stationary during the first part of each digit interval but preferably it is swept at a substantially constant speed. The first-named digit referred to in the preceding paragraph is then represented by switching the beam off immediately after the beginning of the digit interval and thus before the beam has moved far enough from its position at the beginning of the digit interval for neutralisation of the charge produced at the beginning of the interval to occur.

Further according to the present invention there is provided apparatus of the type set forth comprising deflecting means adapted to produce deflection of the cathode ray beam during at least a part of each digit interval, means for switching the cathode ray beam on (if it is not already switched on) at the commencement of each digit interval, means for deriving a control voltage from the voltage generated in the signal plate at instants at or near the commencement of each digit interval, and means for applying the control voltage to control the switching of the beam in such a manner that the beam remains switched on so long as variations in the signal plate voltage at said instants are substantially zero or in a positive-going sense and is otherwise switched off.

In this way it will be found that one digit (A) can be represented as a "well" of positive charge, and the other digit (B) can be represented as a lower positive charge or zero charge. A series of digits A can occupy a series of spots of minimum size at the critical spacing, or at a distance not greatly in excess of the critical spacing, a series of digits B can be produced by irradiating the recording surface with the beam maintained switched on, and a digit A following a digit B can be represented by the "well" of charge occurring at the end of the band of irradiation produced to represent the preceding digit B. Thus the digit intervals can be made approximately equal to or not much greater than the critical distance.

Figures 2, 3, 4:
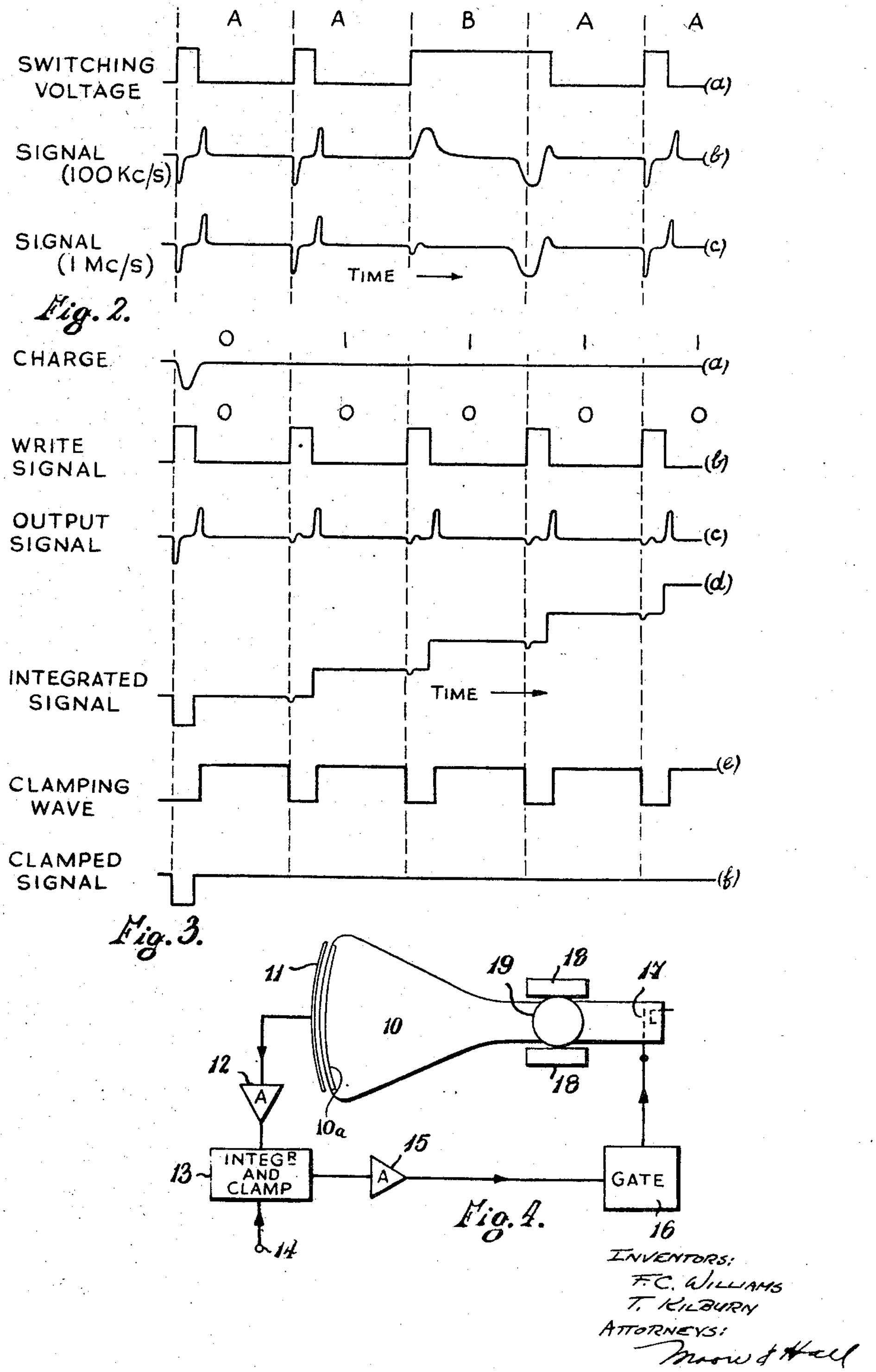
Figure 5:
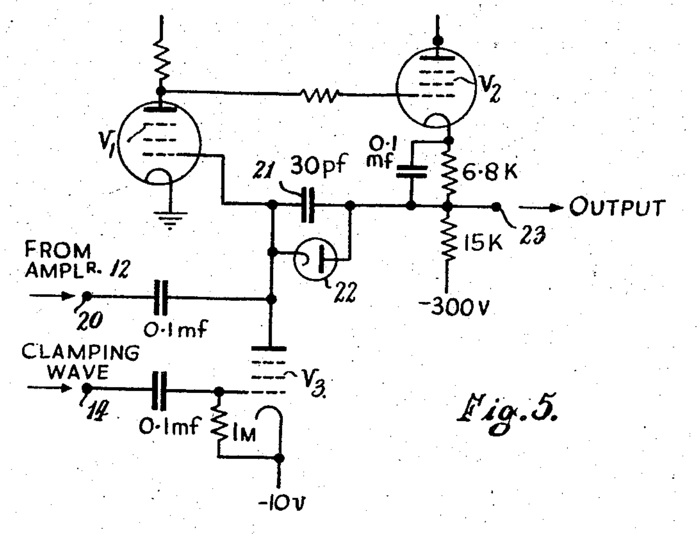
Figure 6:
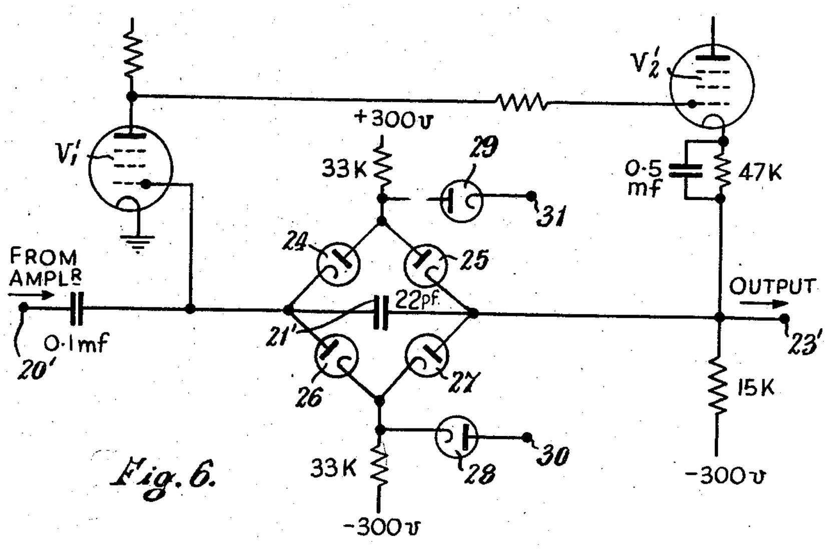
Figure 7:
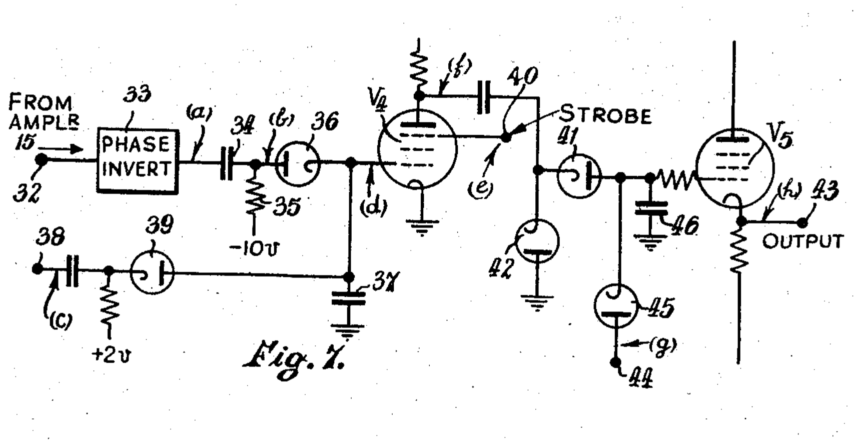
Figure 8:
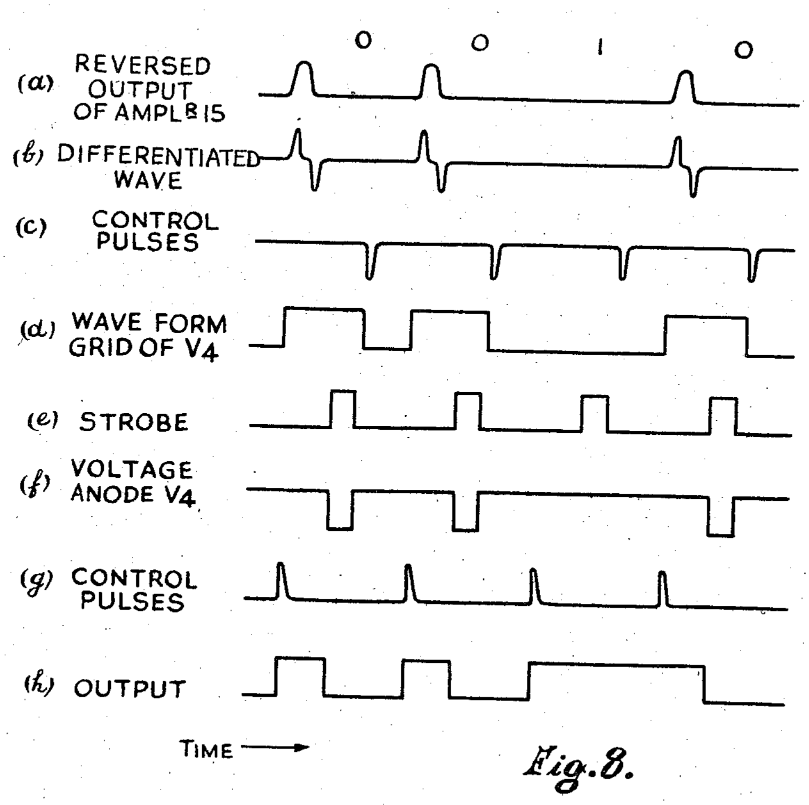

The present invention will be described by way of example with reference to the accompanying drawings in which Figure 1(*a*) to (*d*) and (*e*) to (*h*) are curves and diagrams already referred to illustrating two known systems, Figure 1(*i*) to (*m*) are curves and diagrams illustrating the invention, Figures 1(*n*) and (*o*) define respectively the digit intervals and the information represented in all the curves of Figures 1(*a*) to (*m*), Figures 2 and 3 are further curves illustrating an effect of high speed operation, Figure 4 is a block circuit diagram of a storage device such as may be used in carrying out the invention, Figures 5 and 6 are circuit diagrams of two forms of clamp circuit that may be employed in Figure 4, Figure 7 is a circuit diagram of a gate circuit that may be used in Figure 4, and Figure 8 shows waveforms applied to and generated at various points in Figure 7, the points at which these waveforms exist in Figure 7 being given the letter by which the waveform is indicated in Figure 8. The various waveform curves are shown somewhat idealised for the sake of clearness and simplicity.

In Figure 1, the diagram (*i*) corresponds to the diagrams at (*a*) and (*e*) showing the form of beam switching employed. Curve (*k*) shows the charge distribution produced as a result of this form of switching. Curve (*l*) shows the signal voltage resulting from scanning the charge pattern at (*k*) whilst switching the beam on at the beginning of each digit interval unless at that time it is already switched on. Curve (*m*) shows the strobe voltage used to select the parts of the waveform at (*l*) occurring at the commencement of each digit interval. It will be seen that when a digit A does not occur immediately after a digit B the pulse selected is a negative-going cloud pulse occurring at the beginning of a digit interval. When a digit A occurs immediately after a digit B the pulse selected is also negative-going and also occurs at the beginning of a digit interval but is the anticipation pulse referred to in the description of Fig. 1 (*e*) to (*h*). The present invention is based, as will now be appreciated, on the realisation that information of one kind (here called A) can be represented by negative-going pulses of two different origins, according to whether the digit follows or does not follow immediately after a digit of the other kind B. This enables a considerable reduction to be made in the length of a digit interval. The digit B is represented by a positive-going pulse when the digit follows a digit A and by no signal when the digit B follows another B: in both cases no negative-going pulse occurs at the beginning of a digit interval.

It is to be understood that the time scale employed in curves (*i*) to (*m*) has been chosen the same as that in the other curves for simplicity of explanation but in order to achieve the full benefits of the present invention the time scale in the case of curves (*i*) to (*m*) would be considerably reduced.

A circuit can readily be devised whereby when the signal voltage strobed is negative the beam is switched off, but when the strobed signal voltage is positive or zero the beam is left switched on. The strobed voltages can then be used to regenerate the charge pattern.

Some suitable circuits for carrying out the invention will be described later but before this is done reference is directed to Figure 2 which indicates a phenomenon that has been found to occur when advantage is taken of the present invention in order to increase the digit recurrence frequency. Since in carrying out the present invention account has to be taken only of negative-going signals, it is possible to increase the intensity of the cathode ray beam as is necessary for higher speed operation without difficulty arising from the consequent reduction in amplitude, or loss, of the positive-going signals. This difficulty occurs because of the increased amplitude of the negative-going cloud pulses, resulting from the increased beam intensity, partly or wholly cancelling the positive-going signals.

In Figure 2 there is shown at (*a*) a switching waveform that may be applied to the grid of a cathode ray storage tube to switch the beam on and off. The nature of the intelligence represented is again designated A and B, these letters appearing at the top of the spaces representing digit intervals. At (*b*) is shown the signal obtained on the signal plate of the tube if the digit recurrence frequency is about 100 kc./s. This is of the general character shown in Figure 1(*l*). At (*c*) in Figure 2 is shown the signal obtained if the digit recurrence frequency is raised to 1 mc./s. and the beam intensity correspondingly increased. It will be seen that under these conditions the positive-going signal occurring at the beginning of a "B," and caused by the excavation of a "well" of positive charge, is approximately cancelled out by the negative-going "cloud" pulse arising from the introduction of a cloud of electrons in the neighbourhood of a bombarded spot upon switching on the beam.

For reasons set out in the specification of co-pending application Ser. No. 175,795, filed July 24, 1950, now Patent 2,727,988, it is desirable to integrate the signal (at (*b*) or (*c*) in Figure 2) before extracting therefrom, by strobing, a voltage to control the regeneration of the stored charge. The effect of integration upon a non-symmetrical waveform which arises for example when A is written over B is shown in Figure 3 which illustrates the case of writing 00000 over 01111, the "0" representing the "A" and the "1" representing the "B" of the previous description.

At (*a*) in Figure 3 is shown the charge corresponding to the digit sequence 01111 and at (*b*) the "write" signal applied to switch on the beam in order to write "0" in each digit interval. At (*c*) is shown the output signal and at (*d*) the effect of integrating the output signal. Since at (*c*) there are no negative-going pulses of appreciable amplitude after that in the first digit interval, the positive-going pulses arising from the removal of the electron cloud, when integrated, produce a continually-rising stepped waveform. Such a waveform will be liable to overload an amplifier and is, of course, unsuitable for use in amplitude-selection.

This difficulty associated with integration can be removed by "clamping" the waveform to a predetermined level during each digit interval, using a waveform such as is shown at (*e*) in Figure 3. There can then be produced a signal of the character indicated at (*f*).

Referring now to Figure 4, this shows a cathode ray storage tube 10 having a signal plate 11 connected through an amplifier 12 of say four stages to a circuit 13 serving to effect an approximate integration of, and to clamp, the waveform. Clamping pulses, as in Figure 3(*e*), are applied at a terminal 14 and the integrated and clamped waveform (Figure 3(*f*)) is fed to a further amplifier 15, for example of two stages. The output of the amplifier 15 is applied to a gate circuit 16 which generates a switching signal suitable for application to the control electrode 17 of the cathode ray tube to cause regeneration of the charges stored. Suitable means are of course provided to enable new matter to be written into the store and to enable stored matter to be read. Suitable means, shown as coils 18 and 19 are provided for scanning the beam over the charge-retaining surface 10*a*, which may be the end wall of the tube.

Figure 5 shows one form that the integrating and clamping circuit of Figure 4 may take. Signals from the amplifier 12 of Figure 4 are applied to a terminal 20 in Figure 5 and thus to the control grid of a pentode $V_1$. This valve is arranged as a Miller integrator, the coupling from the anode of $V_1$ to the integrator condenser 21 being through a cathode-follower valve $V_2$. The clamping waveform of Figure 3(*e*) is applied to terminal 14 and thence to the control grid of a pentode $V_3$ having its anode connected to the control grid of $V_1$.

During a clamping interval (when the clamping waveform goes positive) current is fed from the anode of $V_3$ to the grid of $V_1$ and drives the anode of $V_1$ and the cathode of $V_2$ positive until the cathode of $V_2$ is sufficiently positive for a diode 22, connected across the condenser 21, to conduct and provide a feedback path of very low resistance. Further positive movement of the cathode of $V_2$ is thus prevented and the potential of the cathode is fixed during the clamping interval. The output is taken from the cathode of $V_2$ at a terminal 23. The diode 22 also prevents the potential of the terminal 23 from rising above the clamping level even when there is no clamping action. Thus the positive-going peaks in Figure 3(*c*) produce no effect.

A preferred clamping circuit is shown in Figure 6 in which like parts have the same reference as in Figure 5 with a dash superscript. In this case the integrator condenser 21' is connected across one diagonal of a rectifier bridge having four diodes 24, 25, 26 and 27. In this case two clamping waveforms are used, one positive-going as in Figure 3(*e*) being applied to terminal 30 and through a diode 28 and the other negative-going (the waveform of Figure 3(*e*) reversed in polarity as for example by a valve being applied to a terminal 31 and through a diode 29. These clamping pulses render the diodes 24—27 insulating during the negative-going parts of the waveform of Figure 3(*e*) and conducting during the positive-going parts of the waveform.

One form that the gate circuit 16 of Figure 4 may take is shown in Figure 7. Signals from the amplifier 15 of Figure 4 are applied to a terminal 32 and thus to the input of a phase-inverter 33. This phase inverter is not required when the output of the amplifier 15 contains positive-going pulses to represent "0." The signal at the output of the inverter 33 is as shown in Figure 8(*a*). The condenser 34 and resistor 35 serve to differentiate the inverted pulses to produce the waveform (*b*) in Figure 8. This waveform is fed through a diode 36 to the control grid of a pentode $V_4$ and to a condenser 37. The positive-going pulses of Figure 8(*b*) charge the condenser 37 but the negative-going ones are suppressed by the diode 36. In this way the grid of $V_4$ is held at a value determined by the positive-going pulses of Figure 8(*b*) until the condenser 37 is discharged by a pulse of a train shown in Figure 8(*c*) applied to a terminal 38 and through a diode 39 to render this diode conducting. The waveform at the grid of $V_4$ is thus as shown in Figure 8(*d*).

Strobe pulses as at (*e*) in Figure 8 are applied to a terminal 40 and thus to the suppressor of $V_4$ and the anode voltage $V_4$ is as shown in Figure 8(*f*). This voltage is applied through a diode arrangement 41, 42 to a condenser 46 and to the grid of a pentode $V_5$ arranged as a cathode-follower, the output being taken at a terminal 43. Control pulses as shown in Figure 8(*g*) are applied at 44 through a diode 45 to charge the condenser 46 positively.

When the condenser 46 has been charged by a positive pulse (*g*) it retains this charge until a negative-going pulse in the waveform (*f*) renders the diodes 41 and 42 conducting. The output at 43 has, therefore, the form shown in Figure 8(*h*), which is that required to switch the cathode ray beam in order to regenerate the digits in question.

The control pulses at (*c*) and (*g*) and the strobe pulses at (*e*) may be generated in any convenient manner, for example under the control of a master generator which determines the digit recurrence frequency.

In one example of apparatus according to this invention, the beam is scanned over the screen at uniform speed and the digit interval is 2 microseconds during which the beam moves about 4 to 5 spot diameters. In order to represent A in Figure 1 (*i*) to (*o*), when A follows another A, the beam is switched on for about ½ microsecond. Considerably higher speeds of operation are, however, probably obtainable.

We claim:

1. A method of storing digital information in the form of electrostatic charges upon a charge-retaining surface employing a cathode ray beam, comprising sweeping said beam over adjacent areas on said surface during a plurality of successive intervals of time respectively, maintaining the beam on at the beginning and end of a first and a second of said intervals and at the beginning of a third and of a fourth of said intervals, storing a first digit in the third and fourth of said intervals by switching said beam off shortly after the commencement of the third and fourth intervals respectively and storing a second digit in the first and second of said intervals by maintaining the beam switched on through said first and second intervals.

2. Apparatus for storing digital information comprising a cathode ray tube, an electric charge-retaining surface, means to direct the cathode ray beam of said tube upon said surface, means to deflect the beam over adjacent digit storage areas of said surface during successive digit intervals respectively, a first switching means to switch said beam on at the commencement of each said digit interval, unless it is already switched on, a second switching means to switch said beam off shortly after the commencement of each said digit interval, a signal plate capacitively coupled to said surface, and means to apply voltage generated in said signal plate to control said second switching means.

3. Apparatus according to claim 2, wherein the said means to apply voltage generated in the signal plate comprise a pulse generator generating pulses occurring at the commencement of each said digit interval, a gate circuit, means to apply said voltage to said gate circuit, and means to apply such pulses to said gate circuit to permit passage of said voltage therethrough only during said pulses.

4. Apparatus according to claim 2, wherein the said means to apply voltage generated in the signal plate comprise a circuit coupling said signal plate to said second switching means and including means to effect an approximate integration of said voltage and means for clamping said voltage at a fixed, predetermined value during the latter part of each said digit interval.

References Cited in the file of this patent

UNITED STATES PATENTS

| | | |
|---|---|---|
| 2,034,704 | Nakashima et al. | Mar. 24, 1936 |
| 2,461,667 | Sunstein | Feb. 15, 1949 |
| 2,474,628 | Hurvitz | June 28, 1949 |
| 2,589,460 | Tuller | Mar. 18, 1952 |
| 2,642,550 | Williams et al. | June 16, 1953 |
| 2,671,607 | Williams et al. | Mar. 9, 1954 |